United States Patent
Allen et al.

(10) Patent No.: US 11,366,747 B2
(45) Date of Patent: **\*Jun. 21, 2022**

(54) UNIFIED TEST AUTOMATION SYSTEM

(71) Applicant: Sungard Availability Services, LP, Wayne, PA (US)

(72) Inventors: David J. Allen, Holliston, MA (US); Umesh Kute, Maharashtra (IN); Steven Halzel, Fairhaven, MA (US)

(73) Assignee: Sungard Availability Services, LP, Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/049,403

(22) PCT Filed: Mar. 18, 2019

(86) PCT No.: PCT/US2019/022667
§ 371 (c)(1),
(2) Date: Oct. 21, 2020

(87) PCT Pub. No.: WO2019/182932
PCT Pub. Date: Sep. 26, 2019

(65) Prior Publication Data
US 2021/0240602 A1 Aug. 5, 2021

Related U.S. Application Data

(63) Continuation of application No. 15/933,615, filed on Mar. 23, 2018, now Pat. No. 10,783,065.

(51) Int. Cl.
*G06F 11/36* (2006.01)
*G06F 11/34* (2006.01)

(52) U.S. Cl.
CPC ...... *G06F 11/3688* (2013.01); *G06F 11/3476* (2013.01); *G06F 11/3664* (2013.01); *G06F 11/3676* (2013.01)

(58) Field of Classification Search
CPC .......... G06F 11/3638; G06F 11/3476
(Continued)

(56) References Cited

U.S. PATENT DOCUMENTS 5,742,754 A * 4/1998 Tse ............... G06F 11/3688
714/38.14
7,334,222 B2 2/2008 Keller
(Continued)

FOREIGN PATENT DOCUMENTS

EP 2615555 A1 7/2013

OTHER PUBLICATIONS

Szalay, Zsolt. "Next generation X-in-the-loop validation methodology for automated vehicle systems." IEEE Access 9 (2021): pp. 35616-35632. (Year: 2021).*
(Continued)

*Primary Examiner* — Satish Rampuria
(74) *Attorney, Agent, or Firm* — David J. Thibodeau, Jr.; VLP Law Group, LLP

(57) ABSTRACT

An automated testing framework to coordinate functions among code management, build management, automated test, resource reservation, artifact repositories and team communication subsystems. In one embodiment specific to software development, software developers check new code into a code management subsystem, a development project tracking system, or other tools that automatically generate a build. Test suites are then automatically selected and executed based on a scope of the project or code that was built. This scope can include such attributes as what portion of the software was built, the purpose (objective) of the build, the maturity of developing that build, and so forth. In one implementation, label directives may be used to associate build scope to test suites. During or after the automated tests, other actions may then be automatically triggered, to store test results, inform the development team, stored data integrated with test definition and results, or update an artifact repository.

21 Claims, 10 Drawing Sheets

(58) Field of Classification Search
USPC .................................................. 717/124–135
See application file for complete search history.

(56) References Cited

U.S. PATENT DOCUMENTS

| | | | | |
|---|---|---|---|---|
| 8,037,453 | B1 | 10/2011 | Zawadzki | |
| 10,067,863 | B1* | 9/2018 | Gandhi | G06F 11/3672 |
| 10,120,789 | B2* | 11/2018 | Marum | G06F 11/3688 |
| 10,162,740 | B1* | 12/2018 | Setty | G06F 8/60 |
| 2008/0120602 | A1 | 5/2008 | Comstock et al. | |
| 2010/0235807 | A1 | 9/2010 | Nagaraja et al. | |
| 2013/0024842 | A1* | 1/2013 | Browne | G06F 11/3692 |
| | | | | 717/125 |
| 2013/0152047 | A1* | 6/2013 | Moorthi | G06F 11/368 |
| | | | | 717/124 |
| 2015/0193331 | A1* | 7/2015 | Lam | G06F 11/3664 |
| | | | | 717/124 |
| 2015/0331689 | A1* | 11/2015 | Blahaerath | G06F 8/30 |
| | | | | 717/121 |

OTHER PUBLICATIONS

Shahim, Nazli, and Charles Moller. "Economic justification of virtual commissioning in automation industry." 2016 Winter Simulation Conference (WSC). IEEE, 2016.pp. 2330-2441 (Year: 2016).*

Ellis, Clarence A., and Gary J. Nutt. "Office information systems and computer science." ACM Computing Surveys (CSUR) 12.1 (1980): pp. 27-60. (Year: 1980).*

Fraser, Gordon, and Andrea Arcuri. "Evosuite: automatic test suite generation for object-oriented software." Proceedings of the 19th ACM SIGSOFT symposium and the 13th European conference on Foundations of software engineering. 2011.pp. 416-419 (Year: 2011).*

Fraser, Gordon, and Andrea Arcuri. "Whole test suite generation." IEEE Transactions on Software Engineering 39.2 (2012): pp. 276-291. (Year: 2012).*

Walcott, Kristen R., et al. "Timeaware test suite prioritization." Proceedings of the 2006 international symposium on Software testing and analysis. 2006.pp. 1-12 (Year: 2006).*

International Search Report and Written opinion dated Sep. 26, 2019 in related PCT/US2019/022667.

* cited by examiner

| Scope (Label Directive) | Type | TestSuites | TestCases | TAGS |
|---|---|---|---|---|
| Execute Sanity for a development branch build | All tests marked with TAGS=Sanity | VPC_Create and others | TS1(TC1-TCn)... TSn(TC1-TCn) | Sanity |
| Regression for a release | All tests marked with TAGS=Regression | ... | ... | Regression |

| testsuite | testcaseID1 | testcaseID2 | testcaseID3 | testcaseID4 | testcaseID5 | testcaseID6 |
|---|---|---|---|---|---|---|
| VPC_Create | Login | Create_VPC | GET_VPC | Delete_VPC | Get_VPC | Logout |

| TestCaseID | TestCaseID | keyword1 | keyword2 | ... | keywordN |
|---|---|---|---|---|---|
| TestCaseID1 | Login | LoginAWS | AssertLogin | ... | |
| TestCaseID2 | Ceate_VPC | Create_VPC | CreateCIDR | ... | |
| TestCaseID3 | Get_VPC | Get_AllVPC | GetVPCByAccountID | ... | |
| TestCaseID4 | Delete_VPC | DeleteVPCByVPCID | DeleteMultipleVPCForAccount | ... | |
| TestCaseID5 | Get_VPC | Get_AllVPC | Get_VPCByName | ... | |
| TestCaseID6 | Logout | LogoutAWS | AssertLogout | ... | |

FIG. 2

KEYWORD Definition

This is a pseudo code to write a keyword in python def LoginAWS (self, **kwargs):

code to perform AWS Login

Assert login response

Do log in log file for debugging/analysis purpose return response object def Create_VPC(self, **kwargs):

code to perform Create_VPC Operations

Assert VPC_Creation response

Do log in log file for debugging/analysis purpose return response object def Get_AllVPC(self, **kwargs):

code to perform Get_AllVPC Operations

Parse list. Identify if VPC we are expecting is part of list.

Do log in log file for debugging/analysis purpose return response object

KEYWORD Definition

This is a pseudo code to write a keyword in python def DeleteVPCByVPCID (self, **kwargs):

code to perform DeleteVPCBy VPC ID Operations

Assert if VPC is deleted by asserting response

Do log in log file for debugging/analysis purpose return response object def LogoutAWS (self, **kwargs):

code to perform AWS Logout

Assert login response

Do log in log file for debugging/analysis purpose return response object

FIG. 3

Test
Import required libraries to read the data from global configuration file (Environment details)

import variables to read the test data file

* testcaseID1 *
[Tags] Sanity
LoginAWS (url, username, password)
Log response
Assert Response
Log assertion response
[Teardown] teardown.Run

* testcaseID2 *
CreateVPC (param1, param2,..., paramn)
[Tags] Sanity
Log response
Assert Response
Log assertion response
[Teardown] teardown.Run

* testcaseID3 *
Get_VPC (vpcID)
Log response
Assert Response

Test

* testcaseD4 *
[Tags] Sanity
DeleteVPCbyVPCID (vpcID)
Log response
Assert Response
Log response
[Teardown] teardown.Run

* testcaseID5 *
[Tags] Sanity
Get_VPC (vpcID)
Log response
Assert Response
Log assertion response
[Teardown] teardown.Run

* testcaseID6 *
[Tags] Sanity
LogoutAWS ()
Log response
Assert Response
Log assertion response
[Teardown] teardown.Run

FIG. 4

Test Case Management using Jira

500 — * On successful execution of automated test, SUTAS should update the test result to Jira for corresponding project in cloned copy only 510 — * Test case result update to Jira is governed by a flag 511 — * If disabled, test case result won't be updated against cloned copy
  512 — * If enabled, test case result will be updated against cloned copy only
  513 — * Entire life cycle of test case execution is followed. For e.g. When we start execution, Status will be moved to different stages like - "Open" -> "In Progress" -> "Resolved" or "Failed" or "Blocked" as appropriate 520 — * Also, Jira is customized to automate test management workflow to avoid manual intervention. Some of custom fields added are:

521 — * Labels - To define type of test. For e.g. Sanity, MPTC, Regression, Scale, Endurance
  522 — * Automated (Y/N) - To pick test cases for automation and its execution
  523 — * Sutas_id - Must be updated with test case id after creating a test case (So we can uniquely identify test case by sutas_id). This field value can be used to run the test cases from SUTAS with tag option. We are not relying on actual test case id because test case id will change after cloning a test suite

CLONE - Suite_UAT_Test

✏ Edit  💬 Comment  Assign                                                                        ↗  ➘  ⋯

| | | | |
|---|---|---|---|
| Type: | 📄 Test Suite | Assignee: | @Unassigned |
| | | | Assign to me |
| Status: | COMPLETED — 610 | Reporter: | ☐ Automation user |
| Resolution: | Done | Votes: | 0 Vote for this issue |
| Fix/Version/s: | None | Watchers: | 1 Start watching this issue |
| Labels: | None | | |
| Description | This is UAT test suite | Created: | 16 hours ago |
| | | Updated: | 16 hours ago |
| | | Resolved: | 16 hours ago |

> Attachments                                                                ⋯  +
> Issue Links                                                                ⋯  +  Development
Sub-tasks                                                                        Create branch

|   |   | 620 - Test Case level status |   |
|---|---|---|---|
| 1. ⊙ CLONE - Test_RBAC_AccessAdminuser | ? | PASSED | Unassigned |
| 2. ⊙ CLONE - Test_RBAC_AdminUser | ? | PASSED | Unassigned |
| 3. ⊙ CLONE - Test_RBAC_FabricAdminUser | ? | PASSED | Unassigned |
| 4. ⊙ CLONE - Test_RBACNwSvcAdminUser | ? | PASSED | Unassigned |

Agile
View on Board

*FIG. 6*

UNIFIED TEST AUTOMATION SYSTEM

BACKGROUND

Technical Field

This patent application relates to automated testing of Information Technology (IT) systems.

Introduction

The providers of Information Technology (IT) systems are increasingly faced with designing, developing, deploying and managing extremely complicated products and solutions. An example system environment may have many thousands of physical data processing devices and hundreds of installed software applications. A typical software product may have millions of lines of code. Hosted services such as a Private Cloud, Storage Infrastructure, or Managed Recovery may be faced with supporting both hardware and code revisions that change on a daily basis.

The need for improvement in the testing of these systems cannot be understated. Most prior approaches to testing are quite focused, and target specific devices, or specific functions. These often rely on a very large suite of manual tests, which require a corresponding amount of manpower to run them, interpret the results, and respond to them. Even when sufficient manpower is available, it can be difficult to repeat failed tests. The day to day focus tends to be on correcting individual faults and features, and the development team is challenged to effectively test overall system performance, or how it behaves over longer periods of time, scales with increased use and load, and so forth.

Some software development environments provide tools to coordinate the running of tests. For example, these tools may compare current test results to prior test results. Other tools may be specialized to handle the testing of specific devices or functions, such as mobile phones, or graphical user interfaces that that tend to change rapidly.

There is certainly a trend towards leveraging automated solutions for testing software. These solutions permit code to be released faster and in a more predictable way. Continuous Integration is one such approach where software developers merge code changes back to a main code branch frequently. The developer's changes are then validated by creating a new solution (e.g., a new build or set of revised code sections) and then running automated tests against the new solution. Continuous Delivery is an extension of Continuous Integration that automates delivery of new solutions to customers regularly. Continuous Deployment takes this a step further, and distributes new solutions to customers with every incremental change, and without human intervention—if an automated test fails, the new change will not be deployed to production.

There are many tools available that can be leveraged to assist in these CI/CD/CD environments, such as Atlassian JIRA™ and Jenkins (JIRA is a trademark of Atlassian Pty Ltd of Sydney, Australia for task and project management; Jenkins is an open source automation server). There are also many tools that can be leveraged to drive test execution, such as the open source Selenium, Robot Tool, and Watir, Quick Test Professional (QTP™), and many others (Quick Test Professional is a trademark of Hewlett Packard of Palo Alto, Calif. for their test automation software).

SUMMARY OF PREFERRED EMBODIMENTS

The improved automated testing systems and methods described herein are not specifically directed to the detailed design of tests. Rather, they focus instead on integrating automated build, automated test, automated deployment, and automated reporting tools together in a particular way.

The approach can automatically build, test and release code as part of the automated delivery chain. In a preferred arrangement, automation tools may be used to implement an underlying framework to coordinate functions among code management, build management, automated test, resource reservation, artifact repositories and team communication subsystems.

In one embodiment specific to software development, software developers check new code or code revisions into a code management system. Tools within the code management system, a development project tracking system, or other automated build tools may then automatically build the required artifacts using the new code.

After a successful code build result, test suites are then automatically selected and automatically executed against it. The automated selection of test suites depends on attributes of the code that was built. More particularly, the test suites selected may be specified as a function, scope, and purpose of the code build. This scope can include such attributes as what portion of the software was built, the purpose (objective) of the build, the maturity of developing the solution, and so forth.

In one example, the test selection may depend on whether a new feature branch was built, or if the build was a release candidate. Or test selection may depend on whether it was the first build for a new feature, or if it was a minor modification to a legacy feature. One or more of these attributes of the build are then taken into account when determining which tests to run. For example a first build of new code might only trigger a "sanity check" to see if basic aspects of a user interface (such as login and logout screens) are working. However, tests such as performance and scale tests may be determined appropriate when fixing an error in legacy code, or preparing to release a new solution to deployment.

In one implementation, keywords that we refer to as label directives may be used to associate which build scope results in automatically selecting which tests are run.

During or after the automated tests, actions may then be automatically taken, such as to store test results and/or inform the development team whether or not the solution is performing as expected. The reporting of results may also be integrated with test definition, test scheduling, test execution, communication, and analytics tools. In one implementation, test results may be communicated via tools such as Slack or Microsoft Teams. In some implementations, test results can be maintained in an artifact respository. In particular, results of the test in the form of log files and reports can be maintained and tracked over time, and analytics run on test results stored in database.

Development tools may be leveraged to assist with the implementations. For example, a project tracking tool such as Atlassian JIRA may be used to retain the information regarding the current scope of a code build the project, and which tests are associated with that scope. The same or another tool may also be used for defect tracking. For example, if something goes wrong with a test, that failure is recorded in the development system along with a cloned copy of the test suite that was run, log files, and error status. By tracking test results in this way, the system can then automatically determine if the error is something new, or something the team as seen before and are still working on, or something old that the team had previously believed they had fixed but appears to still require attention.

In other aspects, the set of test cases that make up a test suite may also be labelled in other ways. For example, a set of critical test cases might be labelled as "must pass" test cases. The system can treat those as a requiring successful completion before any further step can be taken. Other labels may be used that describe the relative stability of the build. For example, as the team nears the end of the development cycle, it may want to know how volatile the build is—e.g., how many defects is the team still fixing, how many errors are reoccurring, and how many new errors are still being discovered.

Execution dependencies can also be specified as part of the test suite. In this scenario, the physical resources needed to deploy large scale environment may be extensive, expensive, and scarce. Thus test cases can include dependencies or conditions that specify further testing should stop if a certain error is encountered, such as a failure to reserve a resource necessary for test execution, or identification that all required hardware and software infrastructure components are present and operational.

Along these lines, some implementations of the system can automatically reserve and release the resources needed to run a test suite. Part of that reservation process can also include software and hardware validation. The system can be arranged to validate resource requirements such as the type and number of data processing machines available, whether they are correctly configured, whether they have the correct and updated Operating System(s) version(s) installed and so forth. The validation step may be specified as a condition within the test suite.

Certain types of automated tests, such as security tests, may also be included in a test suite. Security-related tests can insure that a code modifications do not introduce security risks into the released environment. Some of these tests may be scans; others may be inspection of different dimensions of the system that affect security integrity.

BRIEF DESCRIPTION OF THE DRAWINGS

The description below refers to the accompanying drawings, of which:

FIG. 2 is an example definition of a test suite with multiple test cases.

FIG. 3 is an example label directive definition.

FIG. 4 shows several test cases in more detail.

FIG. 5 is a test case management flow used with a project tracking tool such as Atlassian JIRA.

FIG. 6 shows an example record for a test result.

DETAILED DESCRIPTION OF AN EMBODIMENT

Introduction

Figure 1A:
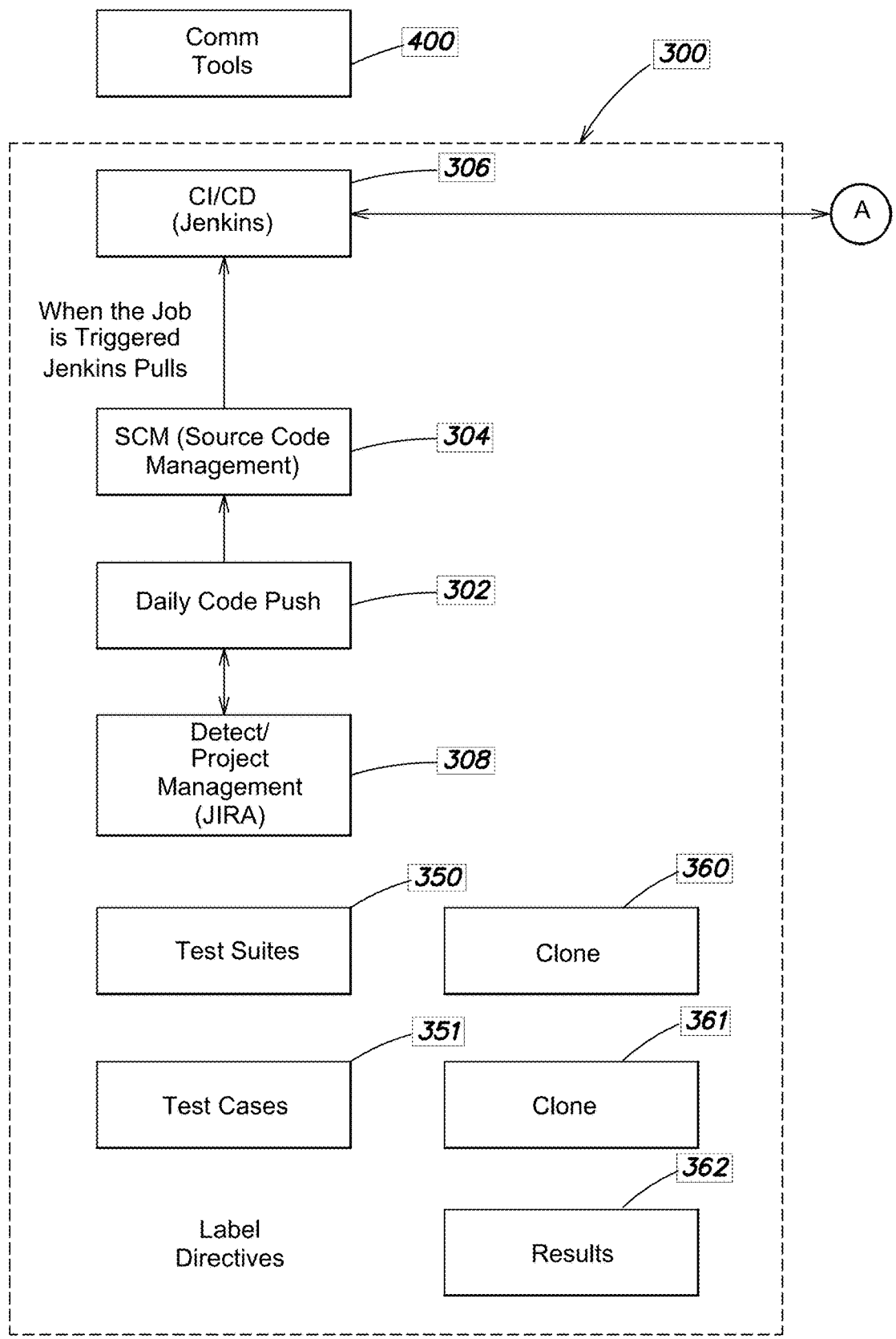
FIG. 1 is a high level system diagram of an Unified Test Automation System.

The systems and methods described herein provide a sophisticated automated test framework that can fully examine product functionality in a Continuous Integration, Continuous Development, and/or Continuous Deployment (CI/CD/CD) environment. The testing framework may be implemented in an automation tool such as Robot Tool, an orchestration engine, or some other programmed data processor. The implementation does not necessarily alter the automation tool but rather builds environment integration and control functionality on top of it. We refer to the framework as a Unified Test Automation System (UTAS).

UTAS can be used for driving sanity, smoke, must pass, regression, environmental, negative, functional, performance, scalability, and reliability testing. It can drive front end test harnesses like Selenium, existing test scripts written in other languages (like JAVA, PowerShell, and Python), and backend tests including infrastructure components using vendor APIs, Command Line Interfaces (CLIs), RESTful APIs, and so forth. Infrastructure testing includes storage, network, virtualization layers, and Graphical User Interfaces (GUI), and external Cloud Provider environments (such as Azure or Amazon Web Services).

In a CI/CD/CD environment, different types of tests must automatically run at different junctures. For example, Smoke test cases must typically be run on every build, but Negative test cases may not be run as frequently. Performance tests, Scalability tests, or Reliability tests may also not be run as frequently as other tests, and typically are not run until a release becomes stable. In addition, engineering project deliverables may be staged into User Acceptance environments and thoroughly tested there. Again, in this environment the testing must be fully configuration driven and automatically triggered through tools. Since the automated process does not involve human actions, the progress and results must be integrated into the control mechanisms employed by the team.

UTAS also provides integration with project tracking and communication tools as follows:

1) UTAS integrates with build management systems such as Jenkins, so that test runs can be automatically executed at completion of events such as code builds.

2) UTAS is integrated with test case management and defect tracking systems, such as Atlassian JIRA™.

a. When an automated testing event is triggered, UTAS clones the appropriate test definitions from JIRA and executes them. The test selection criteria is based on labels assigned to test definitions such as Must Pass, Sanity, Regression, Performance, Negative, etc. Tests may carry multiple labels so that they can be included in these different types of testing.

b. UTAS addresses defect management lifecycle. When UTAS detects that a test has failed, it will open a JIRA defect and automatically populate a headline, a severity, a project, and it will automatically include the log files and information about the test being run and the system elements associated with the test, and what went wrong.

c. In the event that the same defect is seen again, UTAS will re-open the defect if it has previously been resolved in the same release, or it will increment the incident count if the defect is already known and not yet resolved. This helps direct engineering towards the highest value defect to address in order to advance automated testing results and exposure.

3) UTAS integrates with communication channels such as Slack™, Microsoft Team™, and email to provide automatic real-time notification of test execution, test success, and test failure, and execution statistics.

4) UTAS provides integration with artifact repositories to record test execution details (including what the test was, what the result was, what the log file contains, etc.). The exact repository (Artifactory JFrog, Nexxus, Apache, or other) is configurable.

5) UTAS integrates with relational databases (RDBMS) to capture details about test execution for subsequent analytics and examination of test patterns (again, the exact choice of database is configurable). UTAS self-prunes database records according to confirmation so the database cannot run out of space. UTAS provides general SQL queries for data extraction, and supplies integration with tools like Tableau™ and Qlik™-sense for data visualization. (Tableau is a trademark of Tableau Software of Seattle, Wash. for data analytics software; Qlik is a trademark of Qlik Tech International of Radnor, Pa. for data analytics software)

In addition, UTAS supports test execution dependencies. This enables the system to be configured to skip tests that rely on the success of prior tests. This prevents the system from consuming time and resources to attempt to execute tests that cannot possibly pass.

UTAS enables scenario based testing by allowing parameters that are derived from execution of previous tests to be passed onto subsequent tests.

UTAS is capable of automatically cleaning up resources created as part of test execution.

UTAS allows configurable definition of performance expectations. It allows for establishing a 'baseline time to execute', and if that is not met in subsequent test runs, the test suite will fail even though the logical execution was correct and complete. It also allows for a 'maximum time to execute'.

UTAS may be configured to assess performance relative to prior test executions. With this configuration option, UTAS will report whether then performance improved, degraded, or remained consistent.

UTAS enables any test or test suite to be run for a prescribed number of iterations, or for a finite duration. When a duration is configured, UTAS will execute the test repeatedly until the specified time has elapsed. For example, by this method, a test may be run repeatedly from midnight until 6 am.

UTAS will validate the hardware and software environment prior to test execution, to ensure that the right environmental components are present, available, and working.

UTAS can be installed on Windows or Linux, and it runs as an installed instance, as opposed to as-a-service, or client/server based. UTAS may be included in a Docker image to run in a VMWare™ Virtual Machine (VMWare is a trademark of VMWare of Palo Alto, Calif. for managing virtual operating systems software).

UTAS is highly adaptable to leverage the tool sets that are being used in the environment.

Detailed Discussion of an Example Implementation

The following is a description of one example implementation of UTAS.

Figure 1B:
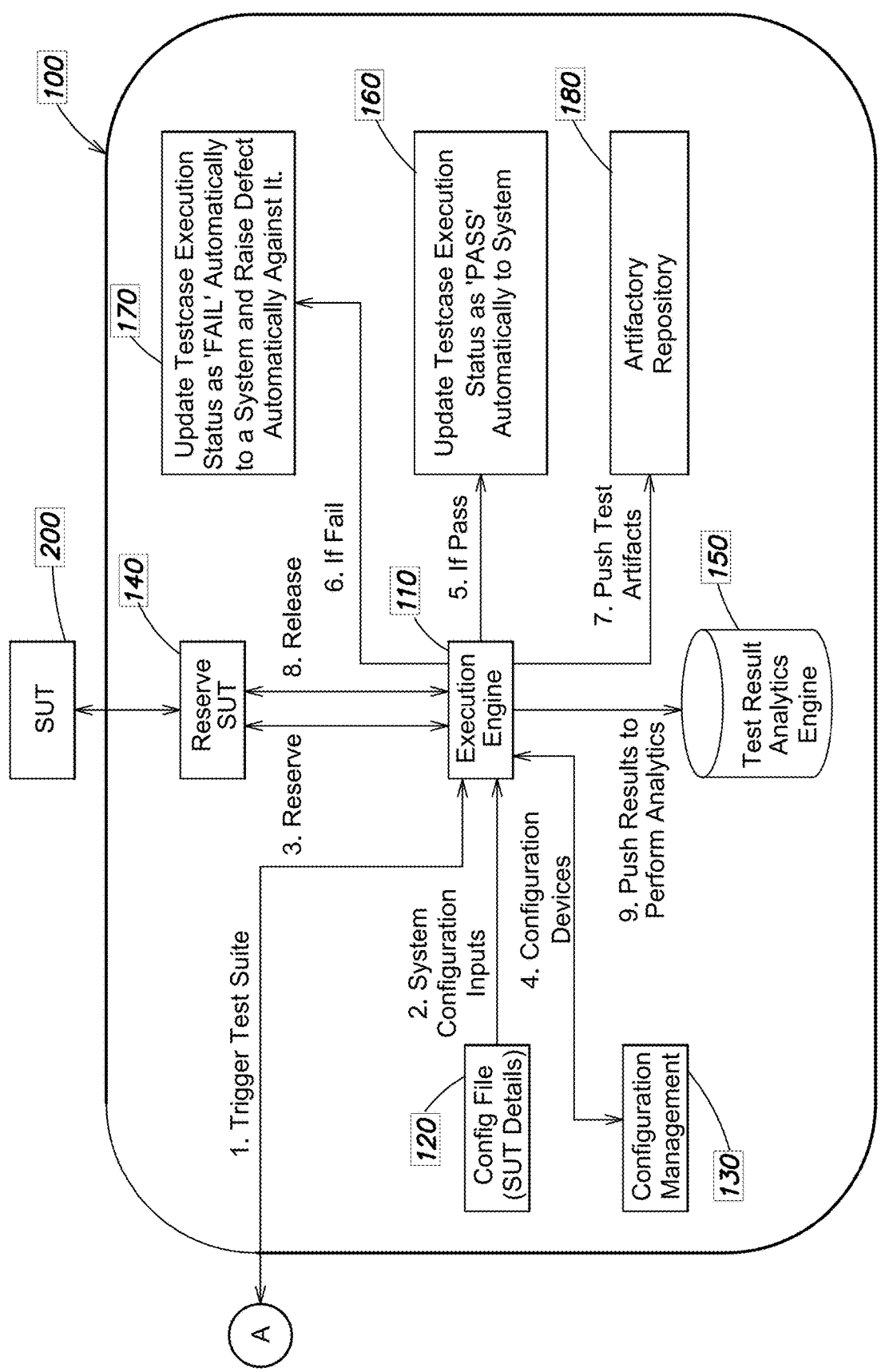

FIG. 1 is a high-level diagram of a example implementation of the SunGard Unified Test Automation System (UTAS). 100. The system 100 interfaces to a system under test (SUT) 200, a build automation subsystem 300, and development team communication tools 400.

The system 100 may be implemented on an execution framework 110 or other automation tool such as Robot Tool, or an orchestration engine, or some other data processing system that is capable of sending and receiving commands and data to other data processing systems and components. The system 100 also consists of a number of data stores and engines such as a configuration data store 120, test result analytics 150 and artifact repository 180. System 100 may also include other subsystems such as a configuration management 130 and resource reservation 140. As will be described shortly, the system 100 automatically triggers the execution of test suites, collects and push the results of those test suites, automatically updates and tracks observed defects, and provides a platform for subsequent analytics.

The build automation subsystem 300 may include Source Code Management (SCM) 304 that enables a development team to documents, computer programs, web sites, and other collections of information. SCM 304 provides a logical way to organize and control revisions in an environment where any of a number of team members may push changes 302 to the same files. The SCM 304 may provide or interface to automated code build functions. Thus a new version of code is built when changes are pushed, enabling a Continuous Integration and/or Continuous Development and/or Continuous Deployment (CI/CD/CD) environment 306. One particular CI/CD/CD environment 306 that may be used is Jenkins, but others are possible.

The build automation subsystem 300 may also include other subsystems that focus on tracking issues and managing tasks for the development team. One such issue tracking and project management tool 308 is Atlassian JIRA, but others are possible. As will be discussed in further detail below, the project management tool 308 may maintain test suites 350 made up of test cases 351, cloned suites 360 and cloned test cases 361, and test results 362.

In one typical workflow, the execution engine 110 within UTAS 100 operates as follows. Team members develop, revise and then issue source code forwarding it to SCM 304. The push may then automatically trigger a new code build. If successful, the code build event is then reported back to execution engine 110. This then causes execution engine 110 to run one or more test suites against the new build. As described in more detail below, execution engine 110 runs one or more test suites against the SUT 200. Each test suite may include one or more test cases. The test suites and/or tests cases are selected based upon so-called labeled directives that are associated with the code build event.

To this end, the execution engine 110 may obtain information from a configuration file 120, including details such as the configuration of the system under test 200. The execution engine 110 may then access a resource reservation system 142 to reserve resources that are necessary to execute the test suite(s) in the SUT 200. After an acknowledgement is received that sufficient resources are available, the execution engine 110 may then use a configuration management subsystem 132 to request devices in the system under test 200 to be configured as needed. Upon acknowledgment that these resources are successfully configured, the execution engine 110 may then execute one or more test suites previously determined to be within the scope of the build. The test suites may include instructions passed from the execution engine 110 to the system under test 200.

If a test suite successfully completes, then a task 160 is executed where the successful test execution status is updated. As explained in more detail below, the test execution status and its artifacts may be tracked in JIRA 308 in a particular way. If a test suite resulted in one or more failures then a task 170 is executed where the failure and its details are noted in JIRA 308. In either event, execution engine 110 executes a task 180 that pushes test artifacts to the artifact repository 180. These test results may then be accessed later by the analytics engine 150 to enable subsequent analytics on the test results. The analytics data store 150 also provide a facility for a development team to request the system 100 to reexecute test cases depending upon the results of subsequent analytics.

There are several potential optional modifications that execution engine 110 may make to this general flow. In particular, the system configuration file 120 and/or resource reservation system 140 may dynamically reserve and release whatever hardware and software is available for the system under test 200 to use; however in other implementations the test cases may specify exactly which particular resources to use for the test suite.

In another aspect, each test suite might specify particular resources that it needs to run and include those as part of the test suite specification. That information may be stored in an associated configuration file 120.

Label directives are important part of ensuring end-to-end automatic execution of the flow by execution engine 110. As mentioned above, a label directive is associated with each test suite or test case. The label directive may be based on some attribute of the code that is being built, the change that has just been made, what phase the project is in, or other things. Because each label directive is then associated with one or more test suites or test cases, it is now possible to automatically select which test suites or test cases are automatically executed upon a code build event.

For example if a label directive indicates that the code development is at an early-stage, perhaps only "must pass" or "sanity" test cases will be executed. However if the label directive indicates that the code build relates to a user interface for a mature legacy feature, then perhaps performance and load tests maybe specified.

Appropriate label directives and the associated test suites/test cases for each project phase or build situation may be specified by the project team members at the time they undertake a particular project. The label directives thus become "building blocks" associated with discrete pieces of functionality testing. The discrete pieces of functionality can then be combined in different ways to create scenarios that test different operating conditions.

FIG. 2 is one example of how label directives may be used to automatically select which test cases and test suites will be run. In this example, a table 250 or other data structure maps a label directive (called a tag 258 in the table 250) to a test suite 254. Note that multiple test cases 256 may be associated with a test suite 254. In this implementation a test suite 254 named "VPC_Create" has "Sanity" tag indicating its purpose is a sanity test—specifically the sanity test for creation of an Amazon Web Services (AWS) Virtual Private Cloud (VPC) instance. Note that other test suites may have other label directives. For example, other test suites (not shown in detail in FIG. 2 may have a Regression label directive. Test suite 254 has six (6) associated test cases (testcaseID1 . . . testcaseID6). Each test case 256 has one or more keywords 260. A keyword may related to a particular test function, such as a call to command line interface (CLI) call (e.g., to login or logout to AWS), or a request to execute one piece of functionality (here to create, get or deleted an AWS VPC instance, etc.)

It should be noted that while each test suite may consist of multiple test cases, each test case may have associated with it a different label directives. Some test cases can have a Label Directive marked for Sanity, but others for Must Pass, and still others labelled for both. So based on the active label directive, the execution engine will select which test cases within the test suite will actually run.

The test suite shown in FIG. 2 is of course but one scenario and many others are possible.

Each test case or test suite may have attributes or arguments specific to each configuration. FIG. 3 illustrates example pseudocode for a specific test case scenario. The LoginAWS test case includes one or more keyword arguments that pass from the configuration data. The LoginAWS includes code to perform an AWS login, assert a login response, stored the response in a log file, and return a response object. A LogoutAWS test case is similar.

The test case definition for Create_VPC is also analogous, but including instead code for invoking a Create_VPC command line operation and assert, log and return VPC creation responses.

Other test cases such as Get_AllVPC may include code to perform more complex functions such as parsing a list of VPC operations to identify whether a particular VPC is, as expected, among a list of operating VPCs. Again appropriate log file entries and return responses are made as with the other test case definitions.

FIG. 4 illustrates a sample test suite with test cases using specified keywords. A first step may be necessary to import libraries needed and to import configuration specific data (environment specific variables) from a configuration file 120. Such environment specific variables may include things such as a URL, username and password for an AWS login. Other parameters needed for other test cases may also be retrieved from the configuration file, such as param1, param2, . . . paramN needed for the CreateVPC test case. The configuration file 120 may also include a specification for the resources needed to run the test suite.

Configuration-specific test cases may also specify a teardown method. The teardown method implements resources cleanup/deletion. It may also cause the project management system (JIRA 308) to either log test results or not depending on configuration data in the configuration file 120 associated with the SUT 200. For example, where a test suite specifies that a number of test cases are to be run in sequence, the resources allocated for a first test case may be left allocated for the next test case, and only released when the last test case is executed.

In addition, a "log test result" flag may be maintained in the configuration file 120. If that flag is enabled, the teardown.Run may cause the execution engine 110 to request JIRA to record the test results for the test case and log a defect (including information regarding a defect lifecycle) and also push the results to the artifact database 180.

When designing the automated test cases, a user also may specify a dependency variable in an initial setup.Run called after the libraries are imported. An example may be:

<setup.Run>@{dependency}=<TestCase7>, <TestCase8>,<TestCase9>, <TestCase10> which may specify that the test cases are dependent upon one another in sequence such that TestCase8 will run only if TestCase7 passes, and TestCase9 only if TestCase8 passes and TestCase10 only if TestCase9 passes. In the event a dependency is encountered, an exception assertion such as "dependency test failed hence cannot execute this test" may be logged as the result.

teardown.Run ${TEST<STATUS>}

When Teardown.Run is executed, the prior test case status may also be updated to a dictionary variable at the time of execution such as {testcase1:PASS, testcase7:FAIL, testcase8:PASS}

So that when TestCase10 execution starts, the first thing it checks is if the prior dependent tests have passed or not, by fetching the dictionary variable(s).

FIG. 5 shows a sequence of steps that may be performed by the execution engine 110 in a teardown.Run. A first state 500 occurs on successful execution of an automated test case. Here execution engine 110 updates the test result to JIRA 308 for the corresponding project. Referring also to FIG. 1, this result 362 is not associated with a master copy of the test suite 350; it is instead only associated with a cloned copy 360 of the test suite in JIRA 308. In other words, as will be described in more detail below, test suites 350 are cloned 360 in JIRA 308 each time they are run (depending on if flag is enabled for JIRA integration). This permits attaching test results 362 to the cloned copies 360, providing the ability to manage test results with particular versions of code and particular test case runs without compromising or complicating the management of the master copy 350. JIRA thus can be used as a resource to record each event of when a test case was run, what the test exactly was and its parameters, exactly what the result was, and whether that specific test generated any defects. As a result the clone copies represent an entire test lifecycle as a defect is opened, in progress, and resolved.

In state 510, a test case result 362 is either updated in JIRA 308 or not, based on the status of a test case result clone integration flag. For example in state 511 if the flag is disabled, the test case result 362 is not updated against the cloned copy 360. However in state 512 if the flag is enabled the test case result 362 will be updated against the clone copy 360. This flag may also be stored in the configuration file 120 on a test case by test case basis, or it can have a more global attribute, and be part of how the execution engine 110 operates.

Logging results to a cloned copy 360 of a test suite with test cases in the project management system 308 has unique benefits. A development team may be using a management tool such as JIRA 308 to track the progress of their developing fixes for bugs. The development team may also use JIRA 308 to define test suites 350 and test cases 351. At the time a automated test is triggered, the clone copies 360 and 361 are also created in JIRA 308 with unique identifiers, and the test suite results are associated with the cloned copies. In this way, while the results of the specific instance of a test suite clone 360 may be recorded, the original test suite definition 350 remains accessible and unaltered for another run.

Being able to associate the results of running a test case to a cloned copy 360 of that test case, rather than a master copy along, can assist the development team in understanding the impact of their code changes. The team can better understand how specific instances of each test case obtained which particular results, and can now more easily compare the results of running test cases with different operating conditions, parameters and scenarios.

Providing a flag that controls the ability to either log test results to the cloned copy of the test case or not also provides additional flexibility. For example, the team may or may not want to rely on (or have access to) a project management system. Providing such a flag permits the framework flow to be easily modified based on a need.

In state 513 the lifecycle state of test case execution can also be recorded in JIRA 308. As test case execution matures, a status field associated with a test case be moved through different stages. The stages may include open, in progress, resolved, failed or blocked as appropriate.

JIRA records 600 may also be further annotated to support automated test management workflow and to avoid manual intervention steps. These additional custom fields may include labels 521 that define the type of the test such as sanity, must pass, regression, scale, or endurance; Automated? 522 indicating whether test case is automated or not and pick test case for execution.

In some implementations, a test suite ID is also updated with a test case ID each time a test case is cloned. This enables unique identification of each test case, allowing the test case results to be further identified when running analytics.

FIG. 6 is an example test execution status record 600 that may be maintained in JIRA for a cloned copy 360 of a test suite. This particular record records the fact that four test cases successfully completed. It also records that the test case was a "development branch", and executed for a JIRA user named "automation user", against whom the automation result is logged. The record 600 may include a test suite status field 610 and one or more test case status fields 620, one such field per test case.

Figure 7:
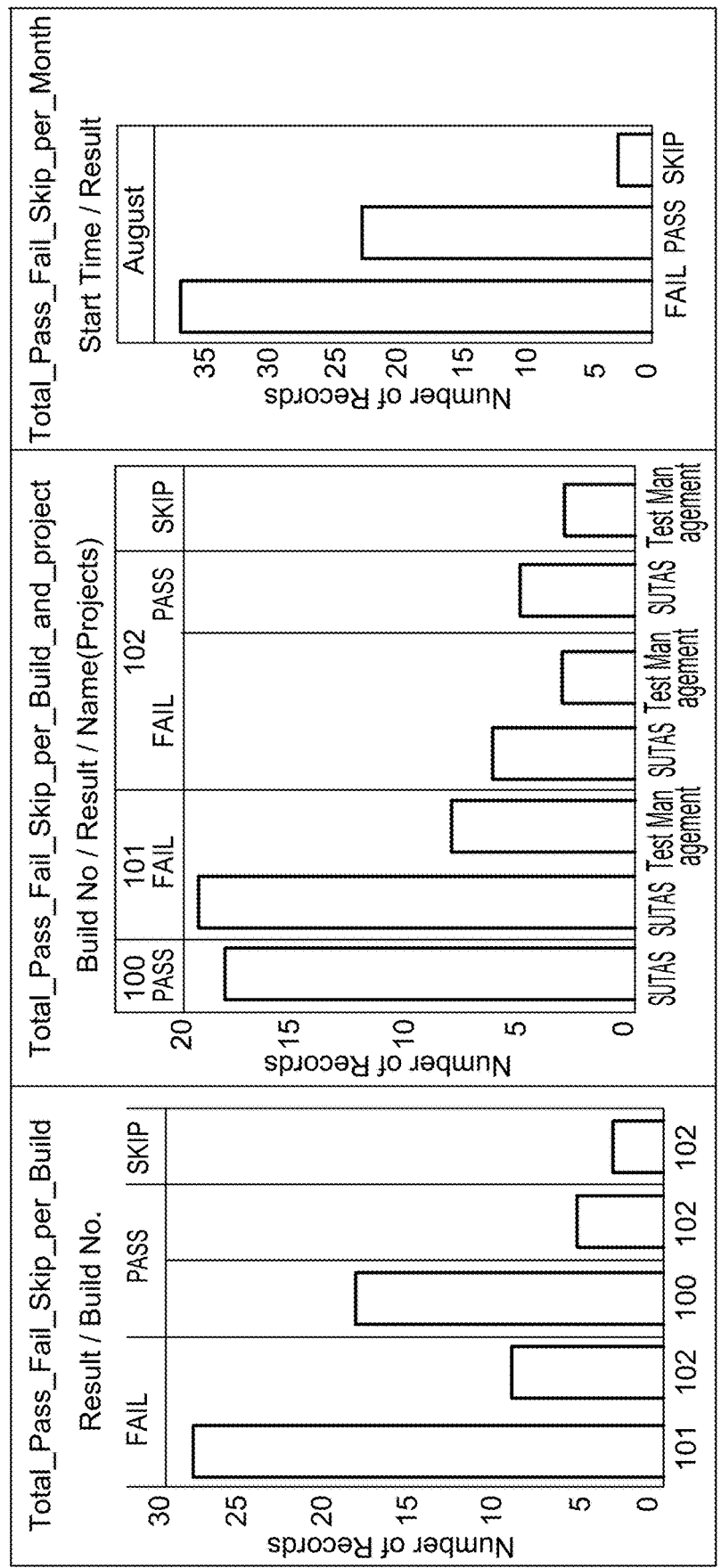
FIG. 7 is an example of the analytics that may be extracted from a test repository.
Figure 8:
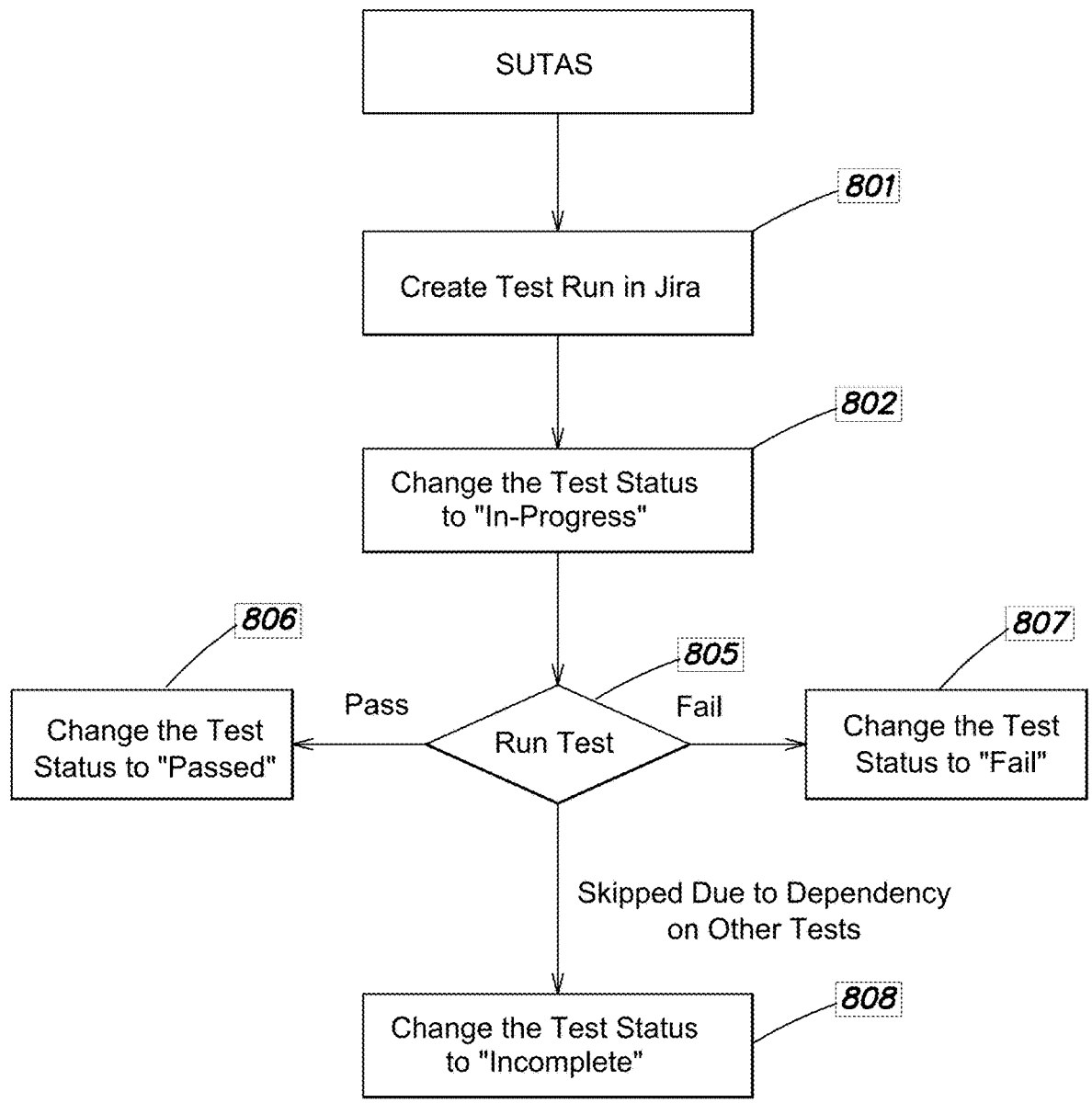
FIG. 8 is a flow diagram for test execution.

FIG. 7 is an example analytics display that maybe generated from the artifact repository records. Here three plots of test results versus number of test records have been generated, including left to right, total number of tests passed, failed, or skipped; the same totals broken down by build type and project, and the totals over a month long period. This data helps in analyzing health of build, overall automation execution statistics and trends, FIG. 8 shows a general high-level flow of the steps that may be performed by the execution engine to record test results in the artifact database. In a first state 801 a test record is created in JIRA, which may involve cloning a test suite as previously described. In state 802 the test status may be changed to in progress. In state 805 the test suite is executed. If the test suite passes in state 806, the test result is changed to pass, however in state 807 if the test fails then the test status is changed to fail. If any test cases in the suite were skipped due to a dependency on another test, then the status is marked as Incomplete.

Figure 9:
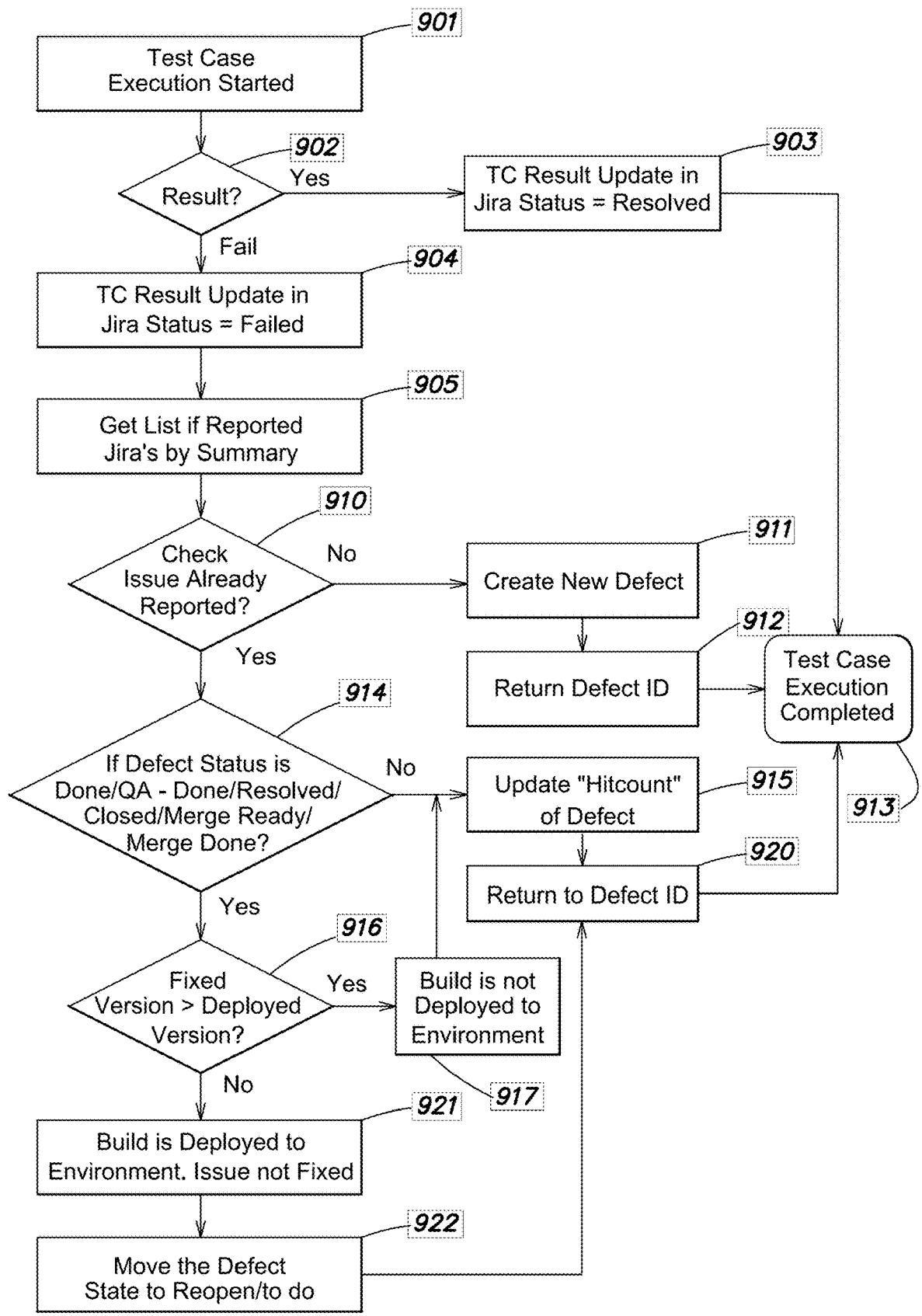
FIG. 9 is a flow diagram for defect management.

FIG. 9 is a more detailed flow diagram of execution engine's 110 interaction with JIRA 308 for defect management. From an initial state 901, test case execution is started. In state 902, if a pass result is obtained, then the test case result is updated in JIRA (e.g., on the cloned copy) with the status as resolved in state 903, and execution can then be marked as completed in state 913.

If however the result from state 902 was a failure, then state 904 is executed to update the test results in JIRA on the cloned copy to indicate a failure status. A list of reported defects and their current defect status (as recorded in JIRA) is then obtained in state 905. In state 910 a check is made if this issue has already been reported. If not, state 911 is next executed to create a new defect record in state 912. Test execution can be marked as completed in state 913.

If however the issue has not as already been reported, then a state 914 is entered to determine if the defect status is indicated as being resolved/closed/or merged. If this is not the case, then state 915 updates the JIRA records and a defect ID is returned in 920. Test case execution can then be marked as complete in state 913.

When the defect status is marked as resolved/closed/or merged, then state 916 is executed to determine if the fixed version is greater than a deployed version. If this is the case, then state 917 determines that the build has not been deployed to the environment. State 915 then updates a hitcount of the existing defect, a defect ID is returned in state 920, and test case execution is completed in state 913.

When the fix version is not greater than a deployed version, then state 921 determines that build is deployed to environment and issue has not been fixed. automatically deploys the new build to the environment, the defect state is moved to reopen in state 922, and a defect ID is returned in state 920, before marking test case execution complete in state 913.

Alternative Directions

The system described above is a foundation for sophisticated automation; first it is a platform upon which can be built quality engineering testing capabilities that cannot be realized through manual testing, including ongoing performance evaluation and scalability testing. The tool affords the ability to determine if any code changes have affected performance, and it allow a project team to scale up system demands and loads to understand limits and behaviors of the system under extreme duress. In addition, the tool enables understanding durability and the behavior of the system under load over long periods of time. Sometimes products work fine under short amounts of time, but constant use over time reveals resource leaks and ultimately failure.

In addition, the system 100 can be used to automate security scanning and evaluation, even unattended evaluation.

The system 100 also affords us the opportunity to mine data from the database of test results in order to learn. For example, the development team can now analyze test patterns using data analytic tools like Tableau™ or Qlik™-sense to learn which tests fail the most frequently, which tests never fail (hence their value against resource cost comes under examination), how many times do tests fail even after a root issue is thought to have been fixed, how many failures do we see for the first time during release validation, or how stable is our code at completion of any given sprint, and so forth. Such analysis can help the development team adjust actions to gain the most quality benefit. The system can be expanded to perform a great deal of this analysis on its own, by employing code based analysis logic.

One definition of the system 100 included a RESTful API with which to drive functionality, but other implementations may execution via CLI using build tools like Jenkins as discussed above.

Implementation Options

Embodiments of the system 100 and specifically the execution engine 110 may comprise or utilize special purpose or general-purpose computers including computer hardware, such as, for example, one or more processors and system memory. These also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions may include, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, virtual machines, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

Therefore, the present invention may be embodied in other specific forms without departing from its spirit or essential characteristics. The described embodiments are to be considered in all respects only as illustrative and not restrictive. The scope of the present invention is, therefore, indicated by the appended claims rather than by the foregoing description.

The invention claimed is:

1. A programmatic, automatically executing method performed by one or more data processors, the method for executing a test suite comprising:
   (a) receiving, from a code build automation system via a communication network, a notification of a code push event;
   (b) triggering a code build;
   (c) receiving, from the code build automation system via a communication network, the code build and a scope of the code build;
   (d) determining a test suite to execute against the code build by matching one or more label directives associated with the scope of the code build;
   (e) executing the test suite against a system under test;
   (f) if the test suite passes,
      i. updating test execution status to pass;
   (g) else if the test suite fails,
      i. updating test execution status to fail;
      ii. recording a defect; and
   (h) storing results of the test execution.

2. The method of claim 1 wherein a build maturity attribute determines the scope.

3. The method of claim 1 wherein a purpose of the build determines the scope.

4. The method of claim 1 wherein the test suite comprises one or more test cases selected from a group consisting of must pass, sanity, regression, functional, performance, scalability, reliability, or endurance tests.

5. The method of claim 1 wherein the label directives are associated with some attribute of the test suite.

6. The method of claim 1 additionally comprising:
(j) automatically reserving resources for executing the test suite;
(k) releasing resources before test suite completes if at least one test case fails.

7. The method of claim 1 additionally comprising;
(k) ensuring a configuration for the system under test is updated before executing the test suite.

8. The method of claim 1 additionally comprising:
(l) performing a security integrity check.

9. The method of claim 1 additionally comprising:
(m) copying a definition of the test suite to a clone copy in a project management system.

10. The method of claim 9 additionally comprising;
(n) logging results of the test execution only to the clone copy and not to the definition of the test suite.

11. The method of claim 1 wherein the steps of detecting code push and triggering a build are performed in an integrated build management system.

12. The method of claim 1 wherein the test suite specifies execution dependencies among two or more test cases.

13. The method of claim 1 additionally comprising managing a defect lifecycle by one or more of:
   i. automatically logging defect details to log file;
   ii. entering defects into a defect management system;
   iii. assigning and tracking defect identifiers;
   iv. updating defect hit count statistics; and
   v. re-opening a previously resolved defect upon rediscovering the same defect.

14. The method of claim 1 executed as a service.

15. The method of claim 1 additionally comprising:
performing one or more defect management lifecycle steps.

16. A test automation system for testing a data processing system under test (SUT), the test automation system comprising one or more processors having one or more non-transitory memory devices coupled thereto, the one or more non-transitory memory devices storing program code that when executed by the one or more processors cause the one or more processors to provide:
   an interface via a communications network to a code management system;
   an interface via a communications network to a resource reservation system, for requesting reservation of resources within the system under test;
   an interface via a communication network to a project management system;
   a test suite execution engine, for executing the program code for:
      (a) receiving notification of a code build event from the code management system and a scope of the code build;
      (b) retrieving a test suite from the project management system;
      (c) determining a test suite to execute against the code build by matching one or more label directives associated with the scope of the code build;
      (d) requesting reservation of resources from the resource reservation system;
      (e) executing the test suite against the system under test;
      (f) if the test suite passes,
         i. updating a test execution status to pass;
      (g) else if the test suite fails
         i. updating a test execution status to fail;
         ii. recording a defect; and
      (h) storing results of the test execution.

17. The system of claim 16 wherein a build maturity attribute determines the scope.

18. The system of claim 16 wherein a purpose of the build determines the scope.

19. The system of claim 16 wherein the test suite comprises one or more test cases selected from a group consisting of must pass, sanity, smoke, regression, functional, performance, scalability, reliability, or endurance tests.

20. The system of claim 16 additionally comprising:
(l) an interface to a project management system; and
(m) wherein the program code is further for requesting the project management system to store a clone copy of the test suite before executing the test suite.

21. The system of claim 20 additionally wherein the program code is further for requesting the project management system to associate a result of the test execution only with the clone copy and not with the test suite.

* * * * *